(12) United States Patent
Qiu et al.

(10) Patent No.: US 11,004,335 B2
(45) Date of Patent: May 11, 2021

(54) SYSTEMS AND METHODS FOR SPEED PREDICTION

(71) Applicant: BEIJING DIDI INFINITY TECHNOLOGY AND DEVELOPMENT CO., LTD., Beijing (CN)

(72) Inventors: Hui Qiu, Beijing (CN); Haibo Li, Beijing (CN); Menghua Jiang, Beijing (CN); Yuhao Qin, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/093,542

(22) Filed: Nov. 9, 2020

(65) Prior Publication Data

US 2021/0090435 A1 Mar. 25, 2021

Related U.S. Application Data

(63) Continuation of application No. PCT/CN2018/114763, filed on Nov. 9, 2018.

(30) Foreign Application Priority Data

Nov. 7, 2018 (CN) .......................... 201811316498.7

(51) Int. Cl.
*G08G 1/01* (2006.01)
*G08G 1/052* (2006.01)
(Continued)

(52) U.S. Cl.
CPC ............. *G08G 1/0141* (2013.01); *G06N 5/04* (2013.01); *G06N 20/00* (2019.01); *G08G 1/0129* (2013.01); *G08G 1/052* (2013.01)

(58) Field of Classification Search
CPC .... G08G 1/0141; G08G 1/0129; G08G 1/052; G08G 1/0133; G08G 1/0145; G08G 1/0125; G06N 20/00; G06N 5/04
See application file for complete search history.

(56) References Cited

U.S. PATENT DOCUMENTS 6,317,686 B1 11/2001 Ran
10,055,504 B2 * 8/2018 Joseph ................... G06F 16/29
(Continued)

FOREIGN PATENT DOCUMENTS

CN 101488284 A 7/2009
CN 102610092 A 7/2012
(Continued)

OTHER PUBLICATIONS

Jingyuan Wang, Short-term Traffic Flow Prediction Based on Deep Learning, China Dissertations Database, 2019, 60 pages.
(Continued)

*Primary Examiner* — Joseph H Feild
*Assistant Examiner* — Rufus C Point
(74) *Attorney, Agent, or Firm* — Metis IP LLC

(57) ABSTRACT

A method for speed prediction may include obtaining current vehicle speeds associated with first vehicles that pass through a target road section in a current time interval. The method may also include determining a current road speed associated with the target road section in the current time interval based on the current vehicle speeds. The method may also include determining a predicted speed difference between the current road speed and a future road speed associated with the target road section in a future time interval based on the current road speed and a trained prediction model, which is based on prior speed differences, wherein the current time interval and the future time interval are separated by a first time period. The method may also (Continued)

include estimating the future road speed based on the predicted speed difference and the current road speed.

17 Claims, 9 Drawing Sheets

(51) Int. Cl.
*G06N 5/04* (2006.01)
*G06N 20/00* (2019.01)

(56) References Cited

U.S. PATENT DOCUMENTS

| | | | |
|---|---|---|---|
| 2007/0208495 A1* | 9/2007 | Chapman | G08G 1/0112 |
| | | | 701/117 |
| 2007/0208498 A1* | 9/2007 | Barker | G08G 1/0104 |
| | | | 701/117 |
| 2008/0071465 A1* | 3/2008 | Chapman | G01C 21/3691 |
| | | | 701/117 |
| 2010/0010731 A1 | 1/2010 | Lee et al. | |
| 2014/0032091 A1* | 1/2014 | Arcot | G08G 1/0129 |
| | | | 701/119 |
| 2014/0309977 A1* | 10/2014 | Kamarianakis | G08G 1/0116 |
| | | | 703/6 |
| 2016/0110654 A1 | 4/2016 | Morimura | |
| 2016/0300140 A1* | 10/2016 | Joseph | G06F 16/955 |
| 2017/0243121 A1 | 8/2017 | Lai | |
| 2018/0108251 A1 | 4/2018 | Macfarlane et al. | |
| 2018/0286224 A1 | 10/2018 | Brodski et al. | |
| 2019/0139402 A1 | 5/2019 | Xu et al. | |

FOREIGN PATENT DOCUMENTS

| | | |
|---|---|---|
| CN | 103745106 A | 4/2014 |
| CN | 104269055 A | 1/2015 |
| CN | 104464304 A | 3/2015 |
| CN | 104680785 A | 5/2015 |
| CN | 103903452 B | 10/2015 |
| CN | 105389987 A | 3/2016 |
| CN | 105679021 A | 6/2016 |
| CN | 106448159 A | 2/2017 |
| CN | 107111941 A | 8/2017 |
| CN | 107293118 A | 10/2017 |
| CN | 108242147 A | 7/2018 |
| CN | 108269401 A | 7/2018 |
| DE | 102017010832 A1 | 5/2018 |
| EP | 1938296 B1 | 9/2011 |
| EP | 2853457 A1 | 4/2015 |
| KR | 20150076307 A | 7/2015 |
| WO | 2017149356 A1 | 9/2017 |

OTHER PUBLICATIONS

Xinrong Zhou, Study on Short Time Traffic Flow Prediction Method of Expressway, China Dissertations Database, 2006, 68 pages.
Jun Kang, et al., Stationary Short-Term Traffic Flow Prediction Method, Measurement & Control Technology, 37(2): 33-37, 2018.
Yuanyuan Luo, Short-term Traffic Flow Analysis Prediction Based on EVIEWS, China Dissertations Database, 2009, 74 pages.
Qi Li, Research on Monitoring and Forecasting Method of Traffic State based on Multi-source Data, China Doctoral Dissertation Full-text Database Information Science and Technology, 2013, 53 pages.
First Office Action in Chinese Application No. 201811316498.7 dated May 18, 2020, 10 pages.
International Search Report in PCT/CN2018/114763 dated Aug. 9, 2019, 4 pages.
Written Opinion in PCT/CN2018/114763 dated Aug. 9, 2019, 5 pages.

* cited by examiner

SYSTEMS AND METHODS FOR SPEED PREDICTION

CROSS-REFERENCE TO RELATED APPLICATIONS

This application is a continuation of International Application No. PCT/CN2018/114763, filed on Nov. 9, 2018, which claims priority to Chinese Patent Application No. 201811316498.7 filed on Nov. 7, 2018, the contents of each of which are incorporated herein by reference.

TECHNICAL FIELD

The present disclosure generally relates to data processing, and more specifically, relates to systems and methods for speed prediction.

BACKGROUND

In many occasions, it is necessary and/or desirable to make reliable predictions about parameters that are changing over time. For example, in transportation systems, it is often important to predict road speed, which refers to the average or medium speed of vehicles passing through a road section in a period of time. The prediction of road speed may be used to determine whether the road section is congested and/or estimate a travel time of passing through the road section. In some cases, the road speed is predicted using machine learning models. However, the traditional methods of using a machine learning model for road speed prediction often involve training the model with historical road speed data from various road sections and including a large number of features. However, such traditional approaches may fail to provide accurate and/or efficient machine learning models due to the fluctuations of road speeds of different road sections and the sometimes wild variations of the feature values. Therefore, it is desirable to provide systems, methods, and models that can efficiently and accurately make predictions about road speeds.

SUMMARY

According to a first aspect of the present disclosure, a system for speed prediction may include one or more storage media and one or more processors configured to communicate with the one or more storage media. The one or more storage media may include a set of instructions. When the one or more processors executing the set of instructions, the one or more processors may be directed to perform one or more of the following operations. The one or more processors may obtain current vehicle speeds associated with first vehicles that pass through a target road section in a current time interval. The one or more processors may determine a current road speed associated with the target road section in the current time interval based on the current vehicle speeds. The one or more processors may determine a predicted speed difference between the current road speed and a future road speed associated with the target road section in a future time interval based on the current road speed and a trained prediction model, which is based on prior speed differences, wherein the current time interval and the future time interval are separated by a first time period. The one or more processors may estimate the future road speed based on the predicted speed difference and the current road speed.

In some embodiments, the trained prediction model may be provided by obtaining prior road speeds associated with a plurality of road sections in prior time intervals; determining a plurality of prior speed differences each of which is between two of the prior road speeds; and training a preliminary prediction model with the plurality of prior speed differences to generate the trained prediction model.

In some embodiments, the obtaining of the prior road speeds associated with the plurality of road sections in the prior time intervals may include obtaining instantaneous speeds associated with second vehicles that pass through the plurality of road sections in the prior time intervals; preprocessing the instantaneous speeds; determining prior vehicle speeds associated with the second vehicles in the prior time intervals based on the preprocessed instantaneous speeds; and determining the prior road speeds based on the prior vehicle speeds.

In some embodiments, the training of the preliminary prediction model with the plurality of prior speed differences to generate the trained prediction model may include dividing the plurality of prior speed differences into a plurality of groups; and training the preliminary prediction model based on the plurality of groups, respectively, to generate the trained prediction model.

In some embodiments, the trained prediction model may be further provided by determining prior speed differences associated with a second time period that is immediately before a current time point; and updating, based on the prior speed differences associated with the second time period, parameters of the trained prediction model for determining the predicted speed difference associated with the first time period.

In some embodiments, the one or more processors may predict whether the target road section is congested in the future time interval.

In some embodiments, the one or more processors may transmit a speed alert to a user device associated with a user of a transportation service, wherein the user has an option to pass through the target road section in the future time interval.

In some embodiments, the speed alert may further include an inquiry to the user for choosing a route that leads to the target road section or another route that does not lead to the target road section.

According to another aspect of the present disclosure, a method for speed prediction may include one or more of the following operations. One or more processors may obtain current vehicle speeds associated with first vehicles that pass through a target road section in a current time interval. The one or more processors may determine a current road speed associated with the target road section in the current time interval based on the current vehicle speeds. The one or more processors may determine a predicted speed difference between the current road speed and a future road speed associated with the target road section in a future time interval based on the current road speed and a trained prediction model, which is based on prior speed differences, wherein the current time interval and the future time interval are separated by a first time period. The one or more processors may estimate the future road speed based on the predicted speed difference and the current road speed.

According to yet another aspect of the present disclosure, a system for speed prediction may include a vehicle speed obtaining module configured to obtain current vehicle speeds associated with first vehicles that pass through a target road section in a current time interval. The system may also include a current speed determination module configured to determine a current road speed associated with the target road section in the current time interval based on the current vehicle speeds. The system may also include a speed difference determination module configured to determine a predicted speed difference between the current road speed and a future road speed associated with the target road section in a future time interval based on the current road speed and a trained prediction model, which is based on prior speed differences, wherein the current time interval and the future time interval are separated by a first time period. The system may also include a future speed estimation module configured to estimate the future road speed based on the predicted speed difference and the current road speed.

According to yet another aspect of the present disclosure, a non-transitory computer readable medium may comprise at least one set of instructions. The at least one set of instructions may be executed by one or more processors of a computer server. The one or more processors may obtain current vehicle speeds associated with first vehicles that pass through a target road section in a current time interval. The one or more processors may determine a current road speed associated with the target road section in the current time interval based on the current vehicle speeds. The one or more processors may determine a predicted speed difference between the current road speed and a future road speed associated with the target road section in a future time interval based on the current road speed and a trained prediction model, which is based on prior speed differences, wherein the current time interval and the future time interval are separated by a first time period. The one or more processors may estimate the future road speed based on the predicted speed difference and the current road speed.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
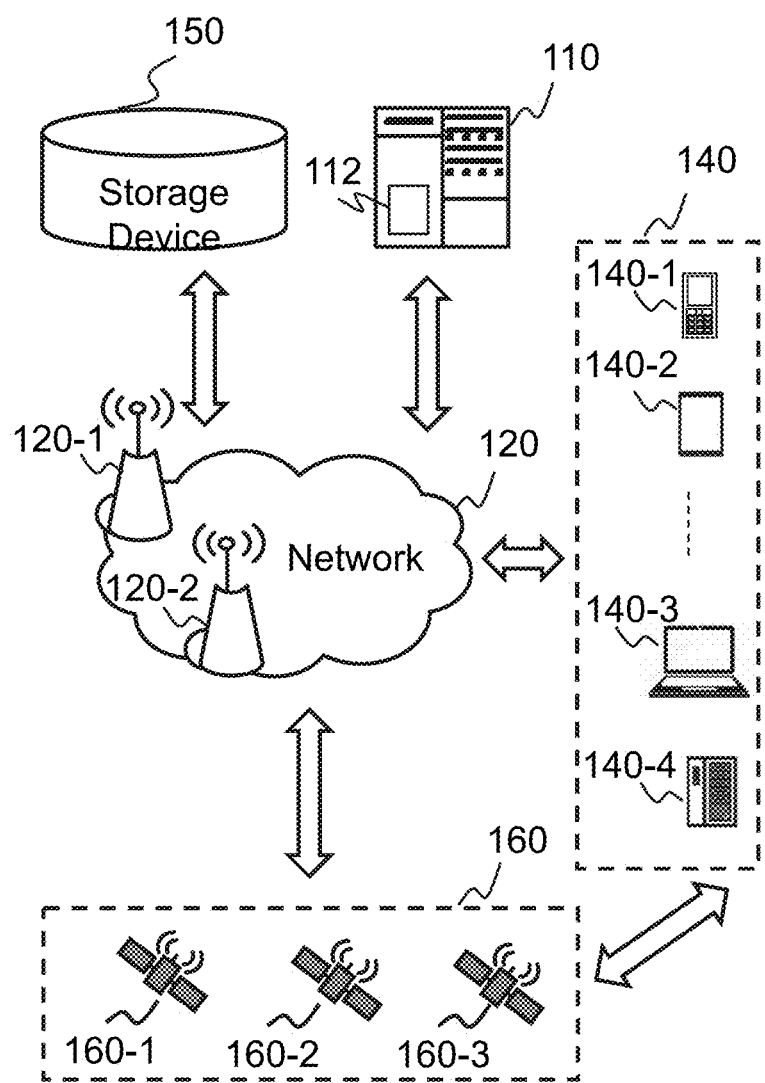
FIG. 1 is a schematic diagram illustrating an exemplary speed prediction system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The systems and methods in the present disclosure may be applied to different scenarios in which a factor that varies over time (e.g., the sales of products, the road speed of a road section, etc.) is required to be predicted. For example, the systems and methods in the present disclosure may be applied to electronic business or transportation systems involving land, ocean, aerospace, or the like, or any combination thereof. The vehicle of the transportation systems may include a taxi, a private car, a hitch, a bus, a train, a bullet train, a high speed train, a subway, a vessel, an aircraft, a spaceship, a hot-air balloon, a driverless vehicle, a bicycle, a tricycle, a motorcycle, or the like, or any combination thereof. The transportation systems may include taxi hailing, chauffeur services, delivery service, carpool, bus service, take-out service, driver hiring, vehicle hiring, bicycle sharing service, train service, subway service, shuttle services, location service, map service, or the like.

In this disclosure, speed prediction for road sections in the transportation system is used as examples. It should be noted that the speed prediction is merely provided for the purposes of illustration, and not intended to limit the scope of the present disclosure. In some embodiments, this disclosure may be applied to other similar situations, such as but not limited to sales prediction, e.g. in the electronic business.

In a process for speed prediction, a current road speed of a road section (e.g., an average or medium value of speeds of vehicles that pass through the road section in a current time interval) and a time period may be input into a trained prediction model. The trained prediction model may output a predicted speed difference between the current road speed and a future road speed after the time period from the current time interval, instead of directly outputting the future road speed. Then the future road speed may be determined by adding the current road speed to the predicted speed difference.

Before the predicted speed difference is determined by the trained prediction model, the trained prediction model may be updated using prior speed differences immediately before the time period from the current time interval.

In a process for generating a trained prediction model, a plurality of prior speed differences may be obtained. The trained prediction model may be generated by training a preliminary prediction model using the plurality of prior speed differences. The prior speed differences of different road sections may all fluctuate around 0. In some embodiments, features of the road sections may be reduced or omitted when the preliminary prediction model is trained because the prior speed differences may decrease the differences of road speeds of different road sections and the differences of different road sections. As a result, training the preliminary prediction model using the prior speed differences often saves computing power and data storage space. In addition, such an approach may increase the accuracy and the efficiency of the trained prediction model compared to training the preliminary prediction model using prior road speeds of different road sections.

FIG. 1 is a schematic diagram of an exemplary speed prediction system according to some embodiments of the present disclosure. The speed prediction system 100 may include a server 110, a network 120, a user terminal 140, a storage device 150, and a positioning system 160.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the user terminal 140, and/or the storage device 150 via the network 120. As another example, the server 110 may be directly connected to the user terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may determine a predicted speed difference between a current road speed and a future road speed of a target road section using a trained prediction model and estimate a future road speed of the target road section based on the predicted speed difference. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the speed prediction system 100 (e.g., the server 110, the user terminal 140, the storage device 150, and the positioning system 160) may send/obtain information and/or data to/from other component(s) in the speed prediction system 100 via the network 120. For example, the processing engine 112 may obtain instantaneous speeds of a plurality of vehicles from the storage device 150 and/or the user terminal 140 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the speed prediction system 100 may be connected to the network 120 to exchange data and/or information.

In some embodiments, the user terminal 140 may be associated with users (e.g., drivers, passengers, or couriers) of the speed prediction system 100. The user terminal 140 may include a mobile device 140-1, a tablet computer 140-2, a laptop computer 140-3, a built-in device in a motor vehicle 140-4, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 140-4 may include an onboard computer, an onboard television, a traveling data recorder, etc. In some embodiments, the user terminal 140 may be a device with positioning technology for locating the position of a user and/or the user terminal 140.

In some embodiments, the user terminal 140 may communicate with other positioning device (e.g., a positioning system 160) to determine the position of a user and/or the user terminal 140. In some embodiments, the user terminal 140 may send positioning information to the server 110.

The storage device 150 may store data and/or instructions. In some embodiments, the storage device 150 may store data obtained from the user terminal 140 and/or the server 110. For example, the storage device 150 may store instantaneous speeds of a plurality of vehicles obtained from the user terminal 140. In some embodiments, the storage device 150 may store data and/or instructions that the server 110 may execute or use to perform exemplary methods described in the present disclosure. For example, the storage device 150 may store instructions that the processing engine 112 may execute to estimate a future road speed of a target road section based on a predicted speed difference. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the speed prediction system 100 (e.g., the server 110, the user terminal 140, the positioning system 160). One or more components in the speed prediction system 100 may access the data or instructions stored in the storage device 150 via the network 120. In some embodiments, the storage device 150 may be directly connected to or communicate with one or more components in the speed prediction system 100 (e.g., the server 110, the user terminal 140, the positioning system 160). In some embodiments, the storage device 150 may be part of the server 110.

The positioning system 160 may determine information associated with an object, for example, the user terminal 140. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, or the user terminal 140 via wireless connections.

Figure 2:
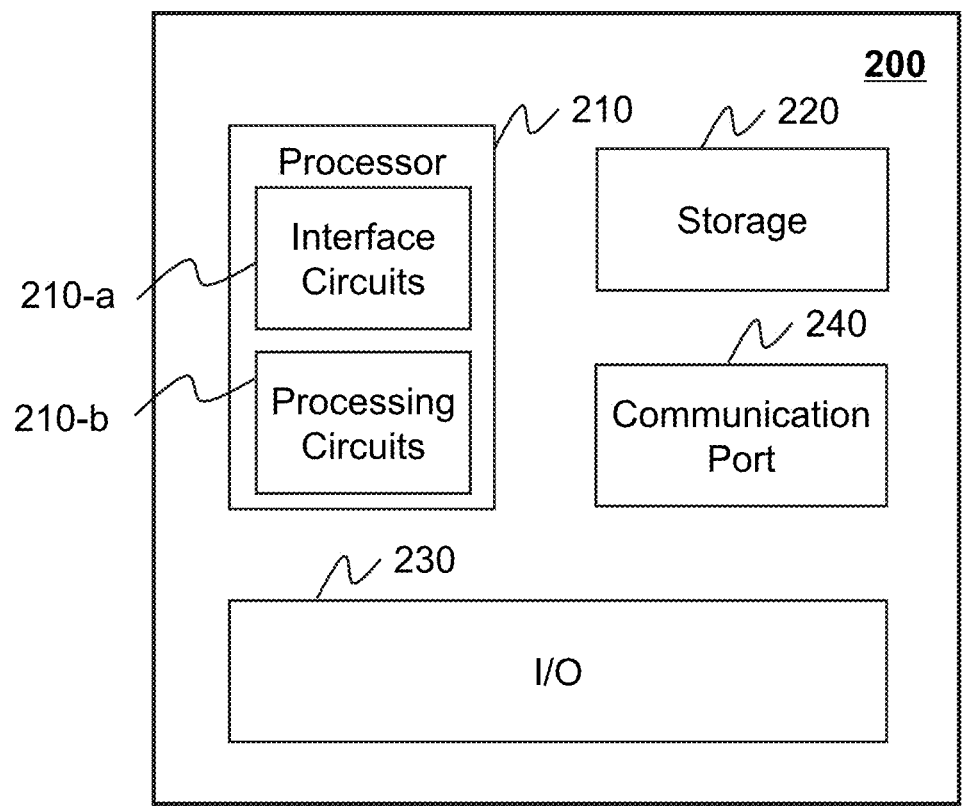
FIG. 2 is a schematic diagram illustrating exemplary hardware and/or software components of a computing device on which a processing engine may be implemented according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode/include structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may determine a predicted speed difference between a current road speed and a future road speed of a target road section using a trained prediction model and estimate a future road speed of the target road section based on the predicted speed difference. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 140, the storage device 150, and/or any other component of the speed prediction system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for estimating a future road speed of the target road section based on the predicted speed difference.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 140, the positioning system 160, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
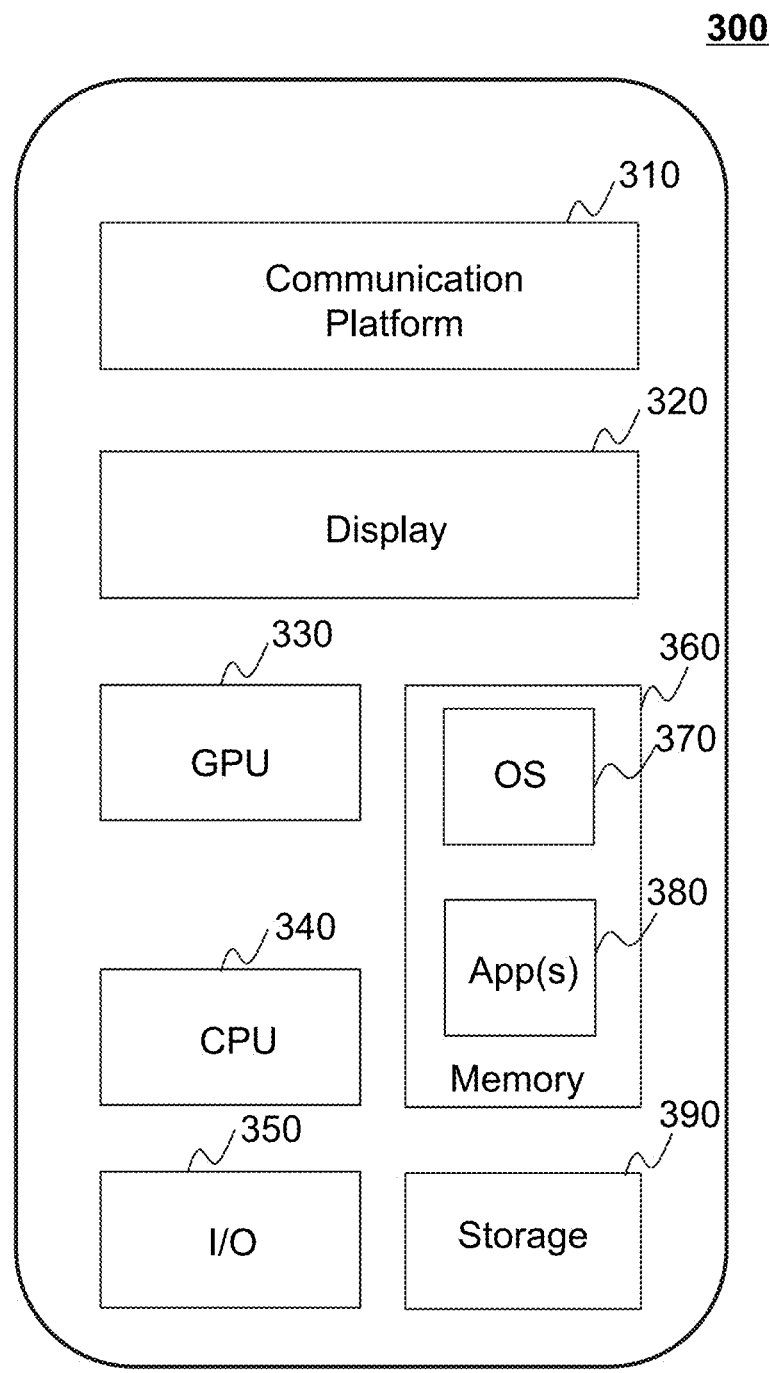
FIG. 3 is a schematic diagram illustrating exemplary hardware and/or software components of a mobile device on which a user terminal may be implemented according to some embodiments of the present disclosure.

FIG. 3 is a schematic diagram illustrating exemplary hardware and/or software components of a mobile device on which the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing engine 112. User interactions with the information stream may be achieved via the I/O 350 and provided to the processing engine 112 and/or other components of the speed prediction system 100 via the network 120. Merely by way of example, a road feature transmit to a service requester may be displayed in the user terminal 140 through the display 320. As another example, a service provider may input an image related to a road segment through the I/O 350.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the speed prediction system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 receives data (e.g., instantaneous speeds of a plurality of vehicles) from the user terminal 140, a processor of the processing engine 112 may receive electrical signals encoding/including the data. The processor of the processing engine 112 may receive the electrical signals through one or more information exchange ports. If the user terminal 140 communicates with the processing engine 112 via a wired network, the information exchange port may be physically connected to a cable. If the user terminal 140 communicates with the processing engine 112 via a wireless network, the information exchange port of the processing engine 112 may be one or more antennas, which may convert the electrical signals to electromagnetic signals. Within an electronic device, such as the user terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage device 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
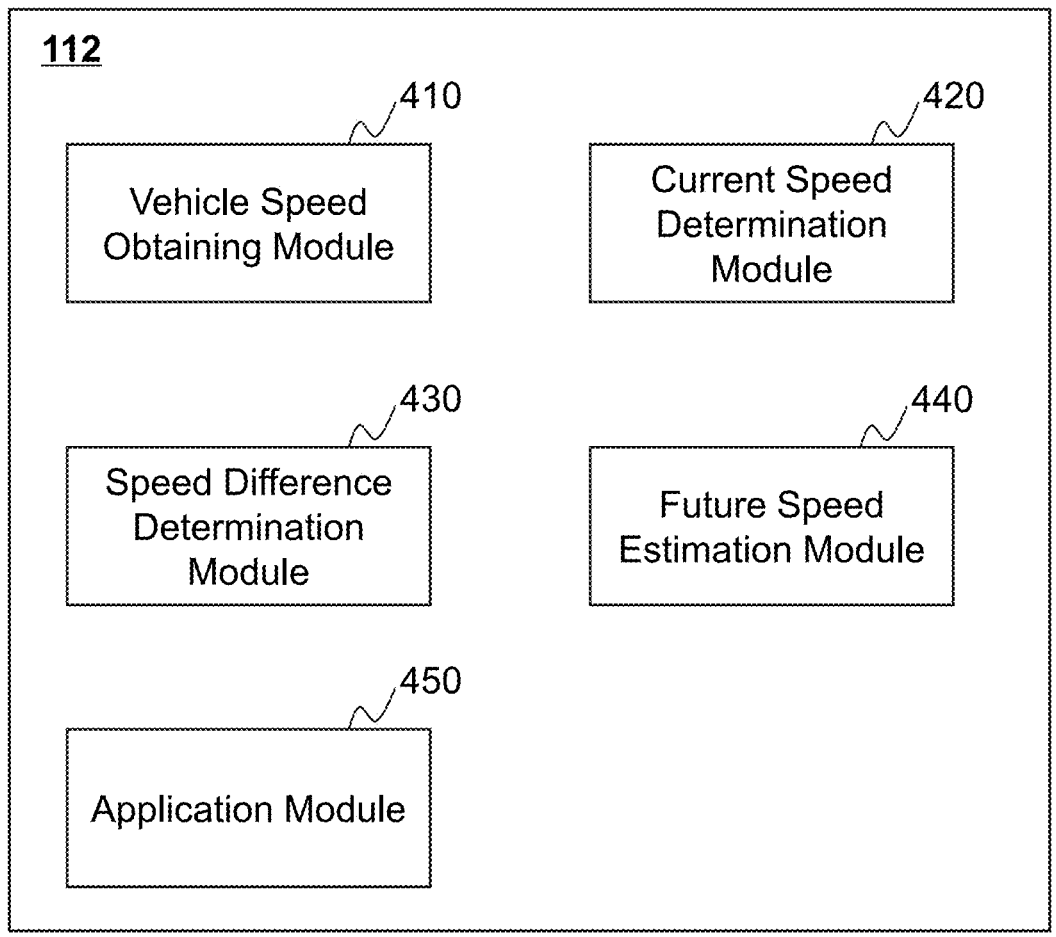
FIG. 4 is a schematic block diagram illustrating an exemplary processing engine according to some embodiments of the present disclosure.

FIG. 4 is a schematic block diagram illustrating an exemplary processing engine according to some embodiments of the present disclosure. The processing engine 112 may include a vehicle speed obtaining module 410, a current speed determination module 420, a speed difference determination module 430, a future speed estimation module 440, and an application module 450.

The vehicle speed obtaining module 410 may be configured to obtain current vehicle speeds of first vehicles that pass through a target road section (also referred to as link) in a current time interval.

A road section may refer to a section (or segment) of a road, which has a certain length (e.g., 100 meters, 200 meters, etc.). For example, the road section may include a straight road section, a curved road section, a crossing, one or more intersections, or a fork road, or the like. A long route (e.g. a route for a planned trip) or a road system of a region (e.g., Beijing) may be divided into a plurality of road sections with same or different lengths. The plurality of road sections may have a spatial relationship and form the road system of the long route or the region if being arranged in spatial order. In some embodiments, the road section may refer to a road link, which is a segment of a road having a specific direction. In some embodiments, the road section may refer to a combination of road links, e.g. links having opposite or nearly opposite directions but belonging to the same segment of the road.

The current time interval may refer to a time interval (e.g., 1 minute, 2 minutes, 5 minutes, etc.) immediately before a current time point. For example, the current time point is 10:00 a.m., and the current time interval may be 9:55 a.m.-10:00 a.m.

In some embodiments, the user terminal 140 may establish a communication (e.g., a wireless communication) with the processing engine 112, via an application installed in the user terminal 140. For example, the application may be a taxi-hailing application or a navigation application.

The instantaneous speed and real-time position of the first vehicle may be obtained through a positioning technology associated the user terminal 140 or the the vehicle, for example, a GPS, a GLONASS, a COMPASS, a QZSS, a WiFi positioning technology, or the like, or any combination thereof. The application installed in the user terminal 140 may direct the user terminal 140 to constantly send the instantaneous speed and the real-time position of the first vehicle to the processing engine 112 and/or the storage device 150. Consequently, the processing engine 112 and/or the storage device 150 may acquire the instantaneous speed and the position of the first vehicle in real-time or substantially real-time.

In some embodiments, the vehicle speed obtaining module 410 may preprocess the instantaneous speeds of the target road section in the current time interval to find errors or inconsistencies in the instantaneous speeds and ensure completeness and accuracy of the instantaneous speeds. If such errors or inconsistencies are verified, ascertained, or determined to be highly likely, the speeds may be preprocessed, for example, by modification, replacement, or omission.

For example, if the vehicle speed obtaining module 410 detects that an instantaneous speed of a vehicle at a time point is −1 km/h, the vehicle speed obtaining module 410 may determine an average value of the instantaneous speeds of the vehicles that are adjacent to the instantaneous speed of −1 km/h (e.g., 10 instantaneous speeds of the vehicle immediately before and after the instantaneous speeds of −1 km/h). The vehicle speed obtaining module 410 may omit the instantaneous speeds of −1 km/h or use the average value to replace the instantaneous speed of −1 km/h.

As another example, for the instantaneous speeds of a vehicle in the target road section, if the vehicle speed obtaining module 410 detects that there are instantaneous speeds that are equal to 0, the vehicle speed obtaining module 410 may check other instantaneous speeds of other vehicles that are corresponding to similar time points to the instantaneous speeds of 0. If most (e.g., greater than 90%) of the other instantaneous speeds are equal to 0, the vehicle speed obtaining module 410 may determine that the instantaneous speeds of 0 is caused by traffic congestion and determine that the instantaneous speeds of 0 are normal data. If few (e.g., less than 5%) of the other instantaneous speeds are equal to 0, the vehicle speed obtaining module 410 may determine that the instantaneous speeds of 0 is caused by rule-breaking or erroneous measurement and determine that the instantaneous speeds of 0 are abnormal data. The vehicle speed obtaining module 410 may determine an average value of non-zero instantaneous speeds of the vehicle in the target road section. The vehicle speed obtaining module 410 may omit the instantaneous speeds of 0 or use the average value to replace the instantaneous speeds of 0.

In some embodiments, the vehicle speed of a vehicle in a time interval may refer to an average speed of the vehicle in the time interval. The vehicle speed obtaining module 410 may determine an average value of the instantaneous speeds of the vehicle in the time interval as the vehicle speed of the vehicle in the time interval. Alternatively, the vehicle speed obtaining module 410 may determine the vehicle speed of the vehicle in the time interval by dividing the distance that the vehicle travels in the time interval by the time interval.

The current speed determination module 420 may be configured to determine a current road speed associated with the target road section in the current time interval based on the current vehicle speeds. In some embodiments, a road speed of a road section may refer to an arithmetic or weighted average value of the vehicle speeds of vehicles that pass through the road section in a time interval. Merely by way of example, when the road speed is determined using the weighted average value, the closer the time point when a vehicle leaves the road section is to the current time point, the greater the weight corresponding to the vehicle may be.

The speed difference determination module 430 may be configured to determine a predicted speed difference between the current road speed and a future road speed associated with the target road section in a future time interval based on the current road speed and a trained prediction model, which is based on prior speed differences. The current time interval and the future time interval may be separated by a first time period. For example, the current time interval may be 9:25-9:30 a.m. and the future time interval may be 10:00-10:05 a.m., the first time period may be 30 minutes from 9:30 a.m.-10:00 a.m.

In some embodiments, the speed difference determination module 430 may input the current road speed and the first time period into the trained prediction model. The speed difference determination module 430 may also input time information of the first time period into the trained prediction model. The time information of the first time period may include information such as but limited to a date of the first time period, predicted weather during the first time period, whether the first time period is rush hour, or the like, or any combination thereof. The trained prediction model may output the predicted speed difference between the current road speed and the future road speed, instead of directly outputting the predicted future road speed, based on the current road speed, the first time period, and the time information of the first time period. In some embodiments, the trained prediction model may include an XGboost model, a factorization machine (FM) model, an autoregressive integrated moving average model (ARIMA), or the like.

In some embodiments, the trained prediction model may be generated online or offline. In some embodiments, the trained prediction model may be generated by the processing engine 112 (e.g., the speed difference determination module 430) or a third-party device communicating with the speed prediction system 100. In some embodiment, the speed difference determination module 430 may generate the trained prediction model in advance and store the trained prediction model in a storage medium (e.g., the storage device 150, the storage 220 of the processing engine 112). In some embodiments, the speed difference determination module 430 may obtain the trained prediction model from the storage medium. In some embodiments, the speed difference determination module 430 may generate the trained prediction model online. In some embodiments, the third-party device may generate the trained prediction model in advance and store the trained prediction model locally or in the storage medium (e.g., the storage device 150, the storage 220 of the processing engine 112) of the speed prediction system 100. The speed difference determination module 430 may obtain the trained prediction model from the storage medium of the speed prediction system 100 or the third-party device. In some embodiments, the third-party device may generate the trained prediction model online and transmit the trained prediction model to the speed difference determination module 430. Detailed description of generating the trained prediction model can be found elsewhere in the present disclosure (e.g., in connection with FIG. 6).

In some embodiments, after obtaining the trained prediction model and before determining the predicted speed difference, the speed difference determination module 430 may update the trained prediction model using latest speed differences (e.g., speed differences in a time period closest to the current time point) to increase the accuracy of the trained prediction model.

Merely by way of example, the speed difference determination module 430 may determine prior speed differences in a second time period that is immediately before the current time point and update, based on the prior speed differences in the second time period, parameters of the trained prediction model for determining the predicted speed difference in the first time period. The durations of the first time period and the second time period may be same or different. For example, the current time point is 10:00 a.m. and the first time period is 30 minutes from 10:00 a.m.-10:30 a.m. The second time period may be 30 minutes from 9:30 a.m. to 10:00 a.m.

The speed difference determination module 430 may obtain instantaneous speeds of vehicles that pass through one or more road sections (e.g., the target road section) in the second time period from, for example, the storage medium (e.g., the storage device 150 and/or the storage 220 of the processing engine 112). The second time period may be divided into a plurality of time intervals (e.g., prior time intervals and the current time interval). For example, the current time point is 10:00 a.m. and the second time period may be 30 minutes from 9:30 a.m. to 10:00 a.m. The second time period may be divided into 6 time intervals, each of which lasts 5 minutes, such as 9:30 a.m.-9:35 a.m., 9:35 a.m.-9:40 a.m., 9:40 a.m.-9:45 a.m., 9:45 a.m.-9:50 a.m., 9:50 a.m.-9:55 a.m., and 9:55 a.m.-10:00 a.m. (the current time interval). The speed difference determination module 430 may determine road speeds of the one or more road sections in the plurality of time intervals (e.g., prior road speeds and the current road speed of the one or more road sections). The speed difference determination module 430 may determine a prior speed difference by determining the difference of two road speeds of a same road section. For example, for each road section, the speed difference determination module 430 may determine the prior speed differences by determining differences between the prior road speeds of the road section and the current road speed of the road section, respectively.

The future speed estimation module 440 may be configured to estimate the future road speed based on the predicted speed difference and the current road speed. For example, the future speed estimation module 440 may estimate the future road speed by adding the predicted speed difference between the current road speed and the future road speed to the current road speed.

In some embodiments, the processing engine 112 may predict the future road speeds of a plurality of road sections by performing the process 500 one by one or simultaneously.

In some embodiments, the future road speeds are required to be predicted so that users can know which roads may be congested or slowed down in the future, which may provide references when the users select a travel route. In this case, the process 500 may be performed periodically (e.g., every half hour) or triggered by a specific condition. For example, the processing engine 112 may automatically predict future road speeds of a plurality of road sections in rush hours (e.g., 7:00 a.m.-10:00 a.m. and 5:00 p.m.-8:00 p.m.) every half hour. As another example, a user may transmit a request for traffic conditions of one or more roads to the processing engine 112. The processing engine 112 may perform the process 500 in response to the request.

Taking the target road section as an example, the application module 450 may be configured to predict whether the target road section is congested in the future time interval. The application module 450 may determine whether the future road speed of the target road section is greater than a speed threshold. In response to a determination that the future road speed is less than or equal to the speed threshold, the application module 450 may determine that the target road section is congested in the future time interval. In response to a determination that the future road speed is greater than the speed threshold, the application module 450 may determine that the target road section is not congested in the future time interval. The application module 450 may transmit a speed alert indicating whether the target road section is congested in the future time interval to user terminals (e.g., the user terminal 140) of users of a transportation service relating to the speed prediction system 100 (e.g., user terminals with an application of the speed prediction system 100, such as a taxi-hailing application or a navigation application) and/or users that transmit the request for traffic conditions. The speed alert may include the location of the target road section and whether the target road section is congested. The speed alert may be in a form of text, voice, picture, video, or the like, or any combination thereof. For example, the application module 450 may transmit the speed alert to direct the user terminal 140 to display the congested road sections in in a noticeable color (e.g. red) and display the uncongested road sections in green in an electronic map of the user terminal 140. The user may have an option to travel through the target road section in the future time interval or choose an alternative route. The speed alert may further include an inquiry to the user for choosing a route that leads to the target road section or another route that does not lead to the target road section. In some embodiments, the processor 112 may calculate travel route differently after determining that a particular road section is congested. For example, while in normal conditions, the target road section would be selected as part of the travel route, a predicted congestion would cause the processor to choose an alternative road section. In the meantime, in some embodiments, the processor may send a message (e.g. similar to a speed alter) to the user terminal, providing an explanation as to why the target road section is not chosen as part of the travel route.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the vehicle speed obtaining module 410 and the current speed determination module 420 may be combined into a single module which may both determine the vehicle speeds and the road speeds. As another example, the vehicle speed obtaining module 410 may be divided into two units. A first unit may obtain instantaneous speeds from user terminals. A second unit may determine vehicle speeds based on the instantaneous speeds.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may further include a storage module (not shown in FIG. 4). The storage module may be configured to store data generated during any process performed by any component of in the processing engine 112. As another example, each of components of the processing engine 112 may correspond to a storage module, respectively. Additionally or alternatively, the components of the processing engine 112 may share a common storage module.

Figure 5:
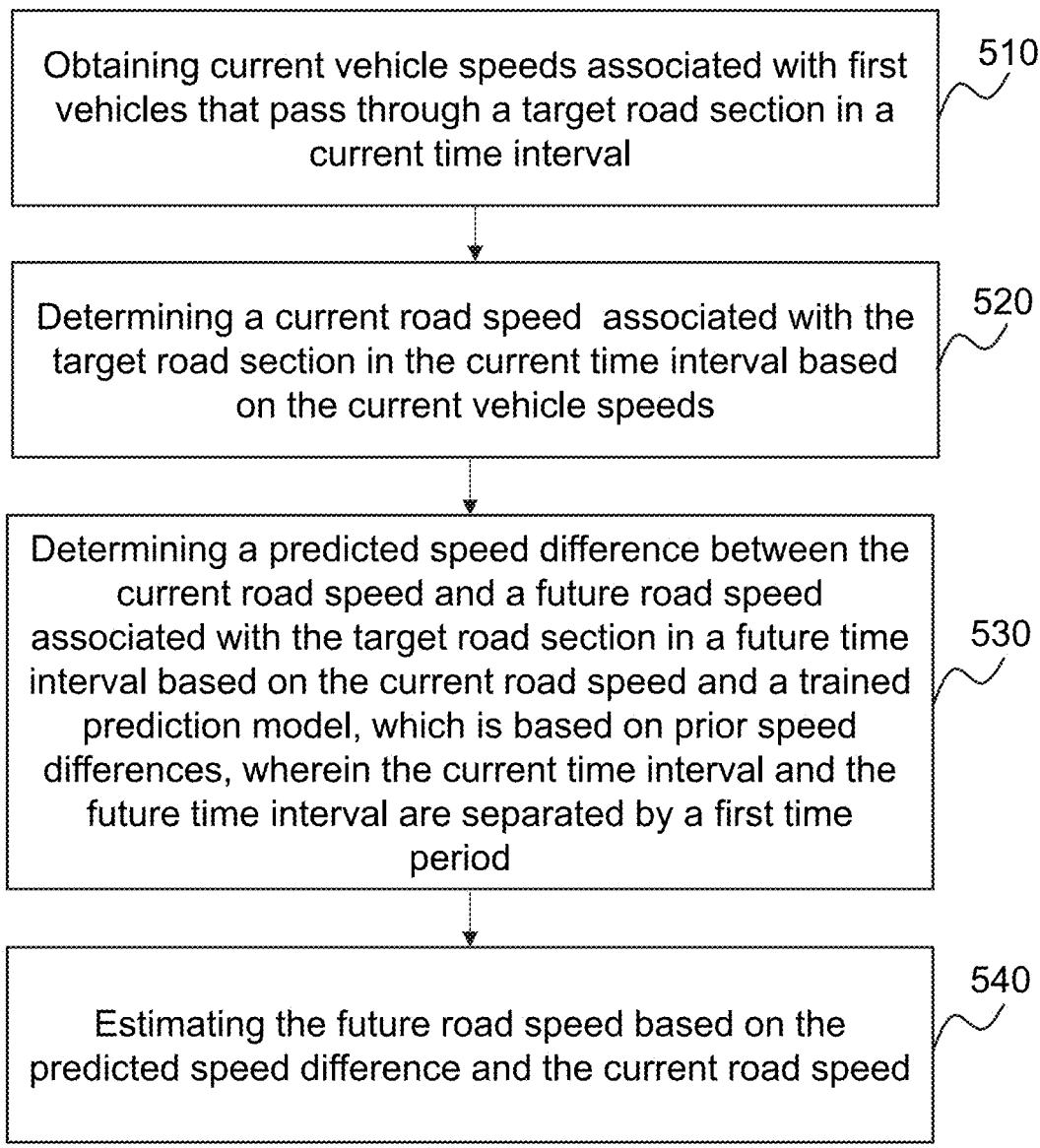
FIG. 5 is a flowchart illustrating an exemplary process for speed prediction according to some embodiments of the present disclosure.

FIG. 5 is a flowchart illustrating an exemplary process for speed prediction according to some embodiments of the present disclosure. In some embodiments, the process 500 may be implemented in the speed prediction system 100 illustrated in FIG. 1. For example, the process 500 may be stored in a storage medium (e.g., the storage device 150, or the storage 220 of the processing engine 112) as a form of instructions, and can be invoked and/or executed by the server 110 (e.g., the processing engine 112 of the server 110, the processor 210 of the processing engine 112, or one or more modules in the processing engine 112 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the vehicle speed obtaining module 410 (or the processing engine 112, and/or the processing circuits 210-*b*) may obtain current vehicle speeds of first vehicles that pass through a target road section (also referred to as link) in a current time interval.

A road section may refer to a section (or segment) of a road, which has a certain length (e.g., 100 meters, 200 meters, etc.). For example, the road section may include a straight road section, a curved road section, a crossing, one or more intersections, or a fork road, or the like. A long route (e.g. a route for a planned trip) or a road system of a region (e.g., Beijing) may be divided into a plurality of road sections with same or different lengths. The plurality of road sections may have a spatial relationship and form the road system of the region or the long route if being arranged in spatial order. In some embodiments, the road section may refer to a road link, which is a segment of a road having a specific direction. In some embodiments, the road section may refer to a combination of road links, e.g. links having opposite or nearly opposite directions but belonging to the same segment of the road.

The current time interval may refer to a time interval (e.g., 1 minute, 2 minutes, 5 minutes, etc.) immediately before a current time point. For example, the current time point is 10:00 a.m., and the current time interval may be 9:55 a.m.-10:00 a.m.

In some embodiments, the user terminal 140 may establish a communication (e.g., a wireless communication) with the processing engine 112, via an application installed in the user terminal 140. For example, the application may be a taxi-hailing application or a navigation application.

The instantaneous speed and real-time position of the first vehicle may be obtained through a positioning technology associated the user terminal 140 or the the vehicle, for example, a GPS, a GLONASS, a COMPASS, a QZSS, a WiFi positioning technology, or the like, or any combination thereof. The application installed in the user terminal 140 may direct the user terminal 140 to constantly send the instantaneous speed and the real-time position of the first vehicle to the processing engine 112 and/or the storage device 150. Consequently, the processing engine 112 and/or the storage device 150 may acquire the instantaneous speed and the position of the first vehicle in real-time or substantially real-time.

In some embodiments, the vehicle speed obtaining module 410 may preprocess the instantaneous speeds of the target road section in the current time interval to find errors or inconsistencies in the instantaneous speeds and ensure completeness and accuracy of the instantaneous speeds. If such errors or inconsistencies are verified, ascertained, or determined to be highly likely, the speeds may be preprocessed, for example, by modification, replacement, or omission.

For example, if the vehicle speed obtaining module 410 detects that an instantaneous speed of a vehicle at a time point is −1 km/h, the vehicle speed obtaining module 410 may determine an average value of the instantaneous speeds of the vehicle that are adjacent to the instantaneous speed of −1 km/h (e.g., 10 instantaneous speeds of the vehicle immediately before and after the instantaneous speeds of −1 km/h). The vehicle speed obtaining module 410 may omit the instantaneous speeds of −1 km/h or use the average value to replace the instantaneous speed of −1 km/h.

As another example, for the instantaneous speeds of a vehicle in the target road section, if the vehicle speed obtaining module 410 detects that there are instantaneous speeds that are equal to 0, the vehicle speed obtaining module 410 may check other instantaneous speeds of other vehicles that are corresponding to similar time points to the instantaneous speeds of 0. If most (e.g., greater than 90%) of the other instantaneous speeds are equal to 0, the vehicle speed obtaining module 410 may determine that the instantaneous speeds of 0 is caused by traffic congestion and determine that the instantaneous speeds of 0 are normal data. If few (e.g., less than 5%) of the other instantaneous speeds are equal to 0, the vehicle speed obtaining module 410 may determine that the instantaneous speeds of 0 is caused by rule-breaking or erroneous measurement and determine that the instantaneous speeds of 0 are abnormal data. The vehicle speed obtaining module 410 may determine an average value of non-zero instantaneous speeds of the vehicle in the target road section. The vehicle speed obtaining module 410 may omit the instantaneous speeds of 0 or use the average value to replace the instantaneous speeds of 0.

In some embodiments, the vehicle speed of a vehicle in a time interval may refer to an average speed of the vehicle in the time interval. The vehicle speed obtaining module 410 may determine an average value of the instantaneous speeds of the vehicle in the time interval as the vehicle speed of the vehicle in the time interval. Alternatively, the vehicle speed obtaining module 410 may determine the vehicle speed of the vehicle in the time interval by dividing the distance that the vehicle travels in the time interval by the time interval.

In 520, the current speed determination module 420 (or the processing engine 112, and/or the processing circuits 210-*b*) may determine a current road speed associated with the target road section in the current time interval based on the current vehicle speeds. In some embodiments, a road speed of a road section may refer to an arithmetic or weighted average value of the vehicle speeds of vehicles that pass through the road section in a time interval. Merely by way of example, when the road speed is determined using the weighted average value, the closer the time point when a vehicle leaves the road section is to the current time point, the greater the weight corresponding to the vehicle may be.

In 530, the speed difference determination module 430 (or the processing engine 112, and/or the processing circuits 210-*b*) may determine a predicted speed difference between the current road speed and a future road speed associated with the target road section in a future time interval based on the current road speed and a trained prediction model, which is based on prior speed differences. The current time interval and the future time interval may be separated by a first time period. For example, the current time interval may be 9:25-9:30 a.m. and the future time interval may be 10:00-10:05 a.m., the first time period may be 30 minutes from 9:30 a.m.-10:00 a.m.

In some embodiments, the speed difference determination module 430 may input the current road speed and the first time period into the trained prediction model. The speed difference determination module 430 may also input time information of the first time period into the trained prediction model. The time information of the first time period may include information such as but limited to a date of the first time period, predicted weather during the first time period, whether the first time period is rush hour, or the like, or any combination thereof. The trained prediction model may output the predicted speed difference between the current road speed and the future road speed, instead of directly outputting the predicted future road speed, based on the current road speed, the first time period, and the time information of the first time period. In some embodiments, the trained prediction model may include an XGboost model, a factorization machine (FM) model, an autoregressive integrated moving average model (ARIMA), or the like.

In some embodiments, the trained prediction model may be generated online or offline. In some embodiments, the trained prediction model may be generated by the processing engine 112 (e.g., the speed difference determination module 430) or a third-party device communicating with the speed prediction system 100. In some embodiment, the speed difference determination module 430 may generate the trained prediction model in advance and store the trained prediction model in a storage medium (e.g., the storage device 150, the storage 220 of the processing engine 112). In some embodiments, the speed difference determination module 430 may obtain the trained prediction model from the storage medium. In some embodiments, the speed difference determination module 430 may generate the trained prediction model online. In some embodiments, the third-party device may generate the trained prediction model in advance and store the trained prediction model locally or in the storage medium (e.g., the storage device 150, the storage 220 of the processing engine 112) of the speed prediction system 100. The speed difference determination module 430 may obtain the trained prediction model from the storage medium of the speed prediction system 100 or the third-party device. In some embodiments, the third-party device may generate the trained prediction model online and transmit the trained prediction model to the speed difference determination module 430. Detailed description of generating the trained prediction model can be found elsewhere in the present disclosure (e.g., in connection with FIG. 6).

In some embodiments, after obtaining the trained prediction model and before determining the predicted speed difference, the speed difference determination module 430 may update the trained prediction model using latest speed differences (e.g., speed differences in a time period closest to the current time point) to increase the accuracy of the trained prediction model.

Merely by way of example, the speed difference determination module 430 may determine prior speed differences in a second time period that is immediately before the current time point and update, based on the prior speed differences in the second time period, parameters of the trained prediction model for determining the predicted speed difference in the first time period. The durations of the first time period and the second time period may be same or different. For example, the current time point is 10:00 a.m. and the first time period is 30 minutes from 10:00 a.m.-10:30 a.m. The second time period may be 30 minutes from 9:30 a.m. to 10:00 a.m.

The speed difference determination module 430 may obtain instantaneous speeds of vehicles that pass through one or more road sections (e.g., the target road section) in the second time period from, for example, the storage medium (e.g., the storage device 150 and/or the storage 220 of the processing engine 112). The second time period may be divided into a plurality of time intervals (e.g., prior time intervals and the current time interval). For example, the current time point is 10:00 a.m. and the second time period may be 30 minutes from 9:30 a.m. to 10:00 a.m. The second time period may be divided into 6 time intervals, each of which lasts 5 minutes, such as 9:30 a.m.-9:35 a.m., 9:35 a.m.-9:40 a.m., 9:40 a.m.-9:45 a.m., 9:45 a.m.-9:50 a.m., 9:50 a.m.-9:55 a.m., and 9:55 a.m.-10:00 a.m. (the current time interval). The speed difference determination module 430 may determine road speeds of the one or more road sections in the plurality of time intervals (e.g., prior road speeds and the current road speed of the one or more road sections). The speed difference determination module 430 may determine a prior speed difference by determining the difference of two road speeds of a same road section. For example, for each road section, the speed difference determination module 430 may determine the prior speed differences by determining differences between the prior road speeds of the road section and the current road speed of the road section, respectively.

In 540, the future speed estimation module 440 (or the processing engine 112, and/or the processing circuits 210-b) may estimate the future road speed based on the predicted speed difference and the current road speed. For example, the future speed estimation module 440 may estimate the future road speed by adding the predicted speed difference between the current road speed and the future road speed to the current road speed.

In some embodiments, the processing engine 112 may predict the future road speeds of a plurality of road sections by performing the process 500 one by one or simultaneously.

In some embodiments, the future road speeds are required to be predicted so that users can know which roads may be congested or slowed down in the future, which may provide references when the users select a travel route. In this case, the process 500 may be performed periodically (e.g., every half hour) or triggered by a specific condition. For example, the processing engine 112 may automatically predict future road speeds of a plurality of road sections in rush hours (e.g., 7:00 a.m.-10:00 a.m. and 5:00 p.m.-8:00 p.m.) every half hour. As another example, a user may transmit a request for traffic conditions of one or more roads to the processing engine 112. The processing engine 112 may perform the process 500 in response to the request.

Taking the target road section as an example, the application module 450 may predict whether the target road section is congested in the future time interval. The application module 450 may determine whether the future road speed of the target road section is greater than a speed threshold. In response to a determination that the future road speed is less than or equal to the speed threshold, the application module 450 may determine that the target road section is congested in the future time interval. In response to a determination that the future road speed is greater than the speed threshold, the application module 450 may determine that the target road section is not congested in the future time interval. The application module 450 may transmit a speed alert indicating whether the target road section is congested in the future time interval to user terminals (e.g., the user terminal 140) of users of a transportation service relating to the speed prediction system 100 (e.g., user terminals with an application of the speed prediction system 100, such as a taxi-hailing application or a navigation application) and/or users that transmit the request for traffic conditions. The speed alert may include the location of the target road section and whether the target road section is congested. The speed alert may be in a form of text, voice, picture, video, or the like, or any combination thereof. For example, the application module 450 may transmit the speed alert to direct the user terminal 140 to display the congested road sections in in a noticeable color (e.g. red) and display the uncongested road sections in green in an electronic map of the user terminal 140. The user may have an option to travel through the target road section in the future time interval or choose an alternative route. The speed alert may further include an inquiry to the user for choosing a route that leads to the target road section or another route that does not lead to the target road section. In some embodiments, the processor 112 may calculate travel route differently after determining that a particular road section is congested. For example, while in normal conditions, the target road section would be selected as part of the travel route, a predicted congestion would cause the processor to choose an alternative road section. In the meantime, in some embodiments, the processor may send a message (e.g. similar to a speed alter) to the user terminal, providing an explanation as to why the target road section is not chosen as part of the travel route.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
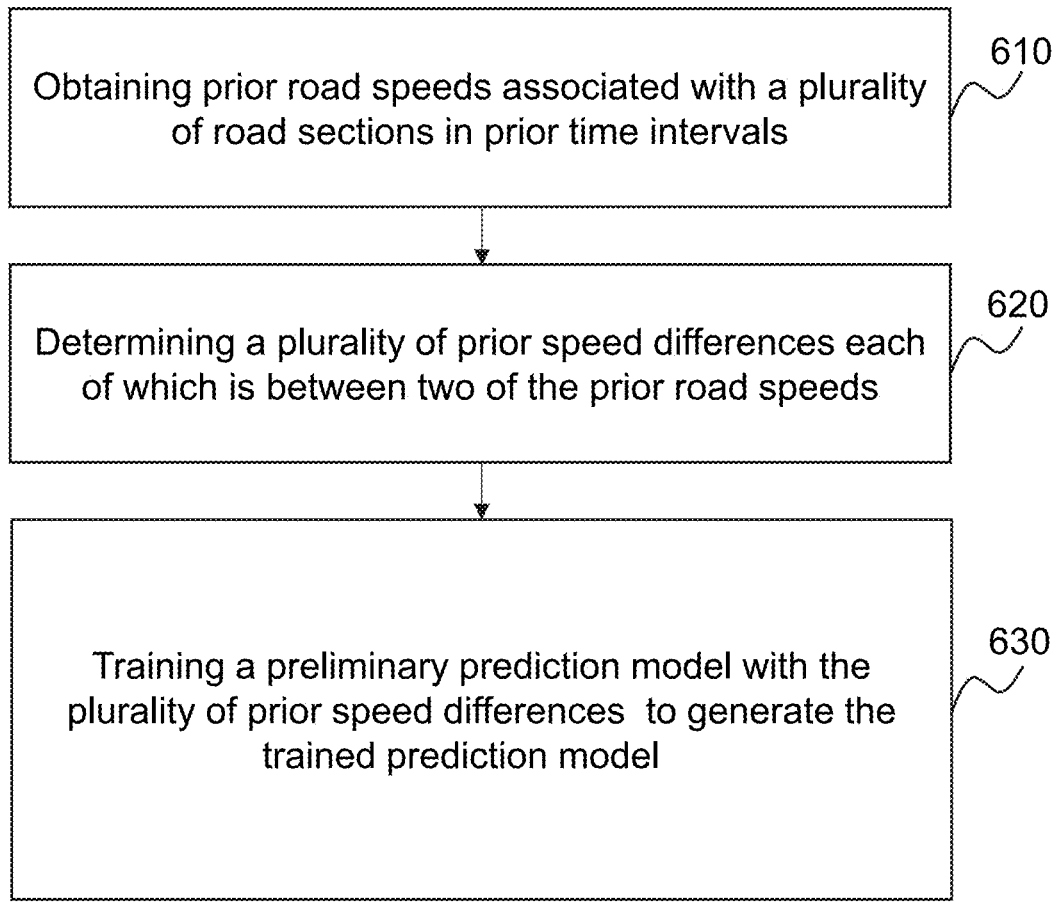
FIG. 6 is a flowchart illustrating an exemplary process for generating a trained prediction model according to some embodiments of the present disclosure.

FIG. 6 is a flowchart illustrating an exemplary process for generating a trained prediction model according to some embodiments of the present disclosure. In some embodiments, the process 600 may be implemented in the speed prediction system 100 illustrated in FIG. 1. For example, the process 600 may be stored in a storage medium (e.g., the storage device 150, or the storage 220 of the processing engine 112) as a form of instructions, and can be invoked and/or executed by the server 110 (e.g., the processing engine 112 of the server 110, the processor 210 of the processing engine 112, or one or more modules in the processing engine 112 illustrated in FIG. 4). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, the trained prediction model described in 530 in FIG. 5 may be provided based on the process 600.

In 610, the speed difference determination module 430 (or the processing engine 112, and/or the processing circuits 210-b) may obtain first prior road speeds associated with a plurality of first road sections in first prior time intervals.

The prior time interval may refer to a time interval (e.g., 1 minute, 2 minutes, 5 minutes, etc.) before the current time point and separated from the current time point. For example, the current time point is 10:00 a.m. on Jul. 31, 2018, and the prior time interval may be 8:00 a.m.-8:05 a.m. on Jul. 31, 2018 or 10:30 a.m.-10:35 a.m. on Jul. 30, 2018. As another example, one day may be divided into a plurality of time intervals of which the durations are same or different. The time interval of one day prior to the current time point may be a prior time interval.

The speed difference determination module 430 may obtain a plurality of prior instantaneous speeds of second vehicles that pass through the plurality of first road sections in the first prior time intervals from the storage medium (e.g., the storage device 150, or the storage 220 of the processing engine 112). The speed difference determination module 430 may determine prior vehicle speeds of the second vehicles in the first prior time intervals based on the prior instantaneous speeds of the second vehicles in the first prior time intervals. For example, for a prior vehicle speed of a second vehicle in a first prior time interval, the speed difference determination module 430 may determine an average value of the prior instantaneous speeds of the second vehicle in the first prior time interval as the prior vehicle speed of the second vehicle in the first prior time interval. Alternatively, the speed difference determination module 430 may determine the prior vehicle speed by dividing the distance that the second vehicle traveled in the first prior time interval by the first prior time interval.

In some embodiments, before determining the prior vehicle speeds, the speed difference determination module 430 may preprocess the plurality of prior instantaneous speeds in the first prior time intervals to find errors or inconsistencies in the plurality of prior instantaneous speeds and ensure completeness and accuracy of the plurality of prior instantaneous speeds. If such errors or inconsistencies are verified, ascertained, or determined to be highly likely, the speeds may be preprocessed, for example, by modification, replacement, or omission.

For example, if the speed difference determination module 430 detects that a prior instantaneous speed of a vehicle at a prior time point is −1 km/h, the speed difference determination module 430 may determine an average value of prior instantaneous speeds of the vehicle that are adjacent to the prior instantaneous speed of −1 km/h (e.g., 10 prior instantaneous speeds of the vehicle immediately before and after the prior instantaneous speeds of −1 km/h). The speed difference determination module 430 may omit the prior instantaneous speed of −1 km/h or use the average value to replace the prior instantaneous speed of −1 km/h.

As another example, for prior instantaneous speeds of a vehicle in a road section, if the speed difference determination module 430 detects that there are prior instantaneous speeds that are equal to 0, the speed difference determination module 430 may check other prior instantaneous speeds of other vehicles that are corresponding to similar prior time points and similar road sections to the prior instantaneous speeds of 0. If most (e.g., greater than 90%) of the other prior instantaneous speeds are equal to 0, the speed difference determination module 430 may determine that the prior instantaneous speeds of 0 is caused by traffic congestion and determine that the prior instantaneous speeds of 0 are normal data. If few (e.g., less than 5%) of the other prior instantaneous speeds are equal to 0, the speed difference determination module 430 may determine that the prior instantaneous speeds of 0 is caused by rule-breaking or erroneous measurement and determine that the prior instantaneous speeds of 0 are abnormal data. The speed difference determination module 430 may determine an average value of nonzero prior instantaneous speeds of the vehicle in the road section. The speed difference determination module 430 may omit the prior instantaneous speeds of 0 or use the average value to replace the prior instantaneous speeds of 0.

The speed difference determination module 430 may determine a first prior road speed of a first road section in a first prior time interval by determining an arithmetic or weighted average value of the prior vehicle speeds of vehicles that pass through the first road section in the first prior time interval.

In 620, the speed difference determination module 430 (or the processing engine 112, and/or the processing circuits 210-*b*) may determine a plurality of prior speed differences, each of which is between two of the prior road speeds of a same road section.

In some embodiments, the plurality of prior speed differences may be divided into a plurality of sample groups. The prior speed differences in each sample group may correspond to a prior time period (e.g., 30 minutes, 1 hour) and different road sections. A sample group corresponding to a prior time period may include prior speed differences between the prior vehicle speed of the last prior time interval in the prior time period and the prior vehicle speeds of other prior time intervals in the prior time period, respectively. For example, a prior time period from 10:00 a.m.-10:30 a.m. may include 6 prior time interval, such as 10:00 a.m.-10:05 a.m., 10:05 a.m.-10:10 a.m., 10:10 a.m.-10:15 a.m., 10:15 a.m.-10:20 a.m., 10:20 a.m.-10:25 a.m., and 10:25 a.m.-10:30 a.m. A sample group corresponding to the prior time period from 10:00 a.m.-10:30 a.m. may include prior speed differences between the prior vehicle speed of 10:25 a.m.-10:30 a.m. and the prior vehicle speeds of the other 5 prior time intervals, respectively. In some embodiments, the prior time periods of the plurality of sample groups may cover or substantially cover 24 hours of one day.

In 630, the speed difference determination module 430 (or the processing engine 112, and/or the processing circuits 210-*b*) may train a preliminary prediction model with the plurality of prior speed differences to generate the trained prediction model. In some embodiments, time information of the plurality of sample groups may also be used to train the preliminary prediction model. The time information of a sample group may include a date of the prior time period corresponding to the sample group, weather of the prior time period corresponding to the sample group, whether the prior time period corresponding to the sample group is the rush hour, or the like, or any combination thereof.

In some embodiments, the trained prediction model may be applicable to any road section and estimating speed differences that are between any two time points and have any duration.

In some embodiments, the speed difference determination module 430 may test the accuracy of the trained prediction model using a plurality of second prior road speeds of a plurality of second road sections in second prior time intervals. The second prior road speeds may be different from the first prior road speeds. The second road sections may be same as or different from the first road sections. The second prior time intervals may be different from the first prior time intervals. For example, the first prior time intervals may be within last week, and the second prior time interval may be within the week before last. The speed difference determination module 430 may input the second prior road speeds and a testing time period (e.g., 30 minutes, 1 hour, etc.) to the trained prediction model. The trained prediction model may output testing speed differences in the testing time period. The speed difference determination module 430 may determine true speed differences in the testing time period based on the second prior road speeds. The speed difference determination module 430 may determine a mean absolute error (MAE) between the testing speed differences and the true speed differences. The larger the MAE is, the more accuracy the trained prediction model may be. If the MAE is less than a threshold value, the speed difference determination module 430 may output the trained prediction model. If the MAE is greater than or equal to the threshold value, the speed difference determination module 430 may train the preliminary prediction model again.

Figure 7:
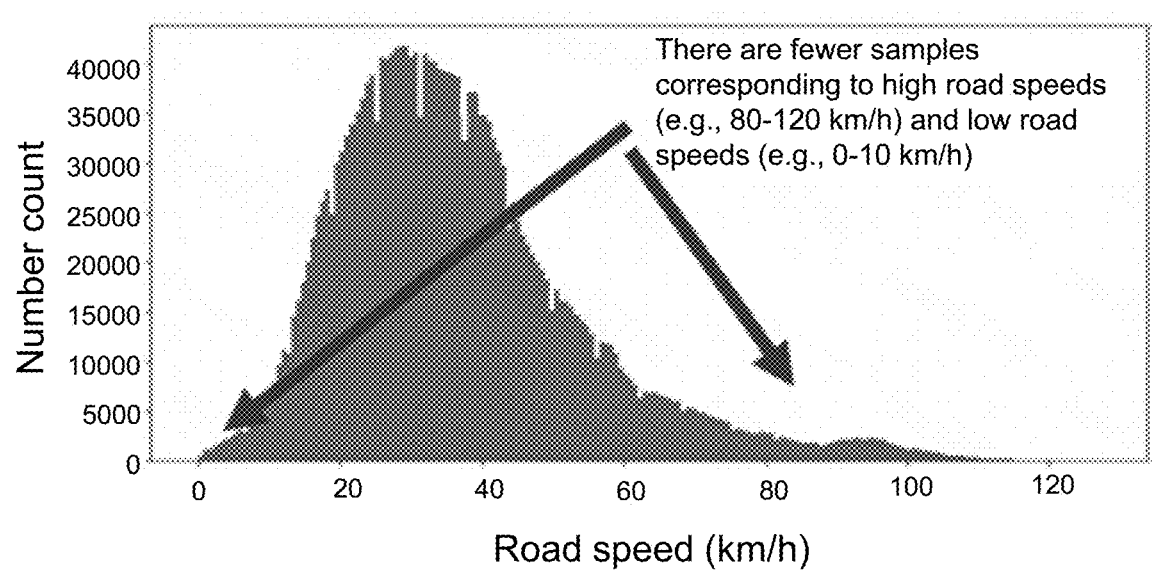
FIG. 7 is a diagram of an example of the number distribution of samples related to road speeds of different road sections according to some embodiments of the present disclosure.

FIG. 7 is a diagram of an example of the number distribution of samples related to road speeds of different road sections according to some embodiments of the present disclosure. As shown in FIG. 7, the horizontal axis represents road speeds, and the vertical axis represents the number counts of samples related to the road speeds. As shown in FIG. 7, there are fewer samples corresponding to high road speeds (e.g., 80-120 km/h) and low road speeds (e.g., 0-10 km/h). If the trained prediction model is generated by training a preliminary prediction model directly using these road speeds, the accuracy of the trained prediction model will be low because the samples corresponding to the high road speeds (e.g., 80-120 km/h) and the low road speeds (e.g., 0-10 km/h) are insufficient. In addition, if the trained prediction model is generated by training a preliminary prediction model directly using these road speeds, a large number of features (e.g., features related to different road sections) may be required to make the trained prediction model sufficiently accurate. Therefore, training a preliminary prediction model directly using these road speeds directly is likely to fail in providing accurate and/or efficient machine learning models due to the fluctuations of road speeds of different road sections and the sometimes wild variations of the feature values.

Figure 8:
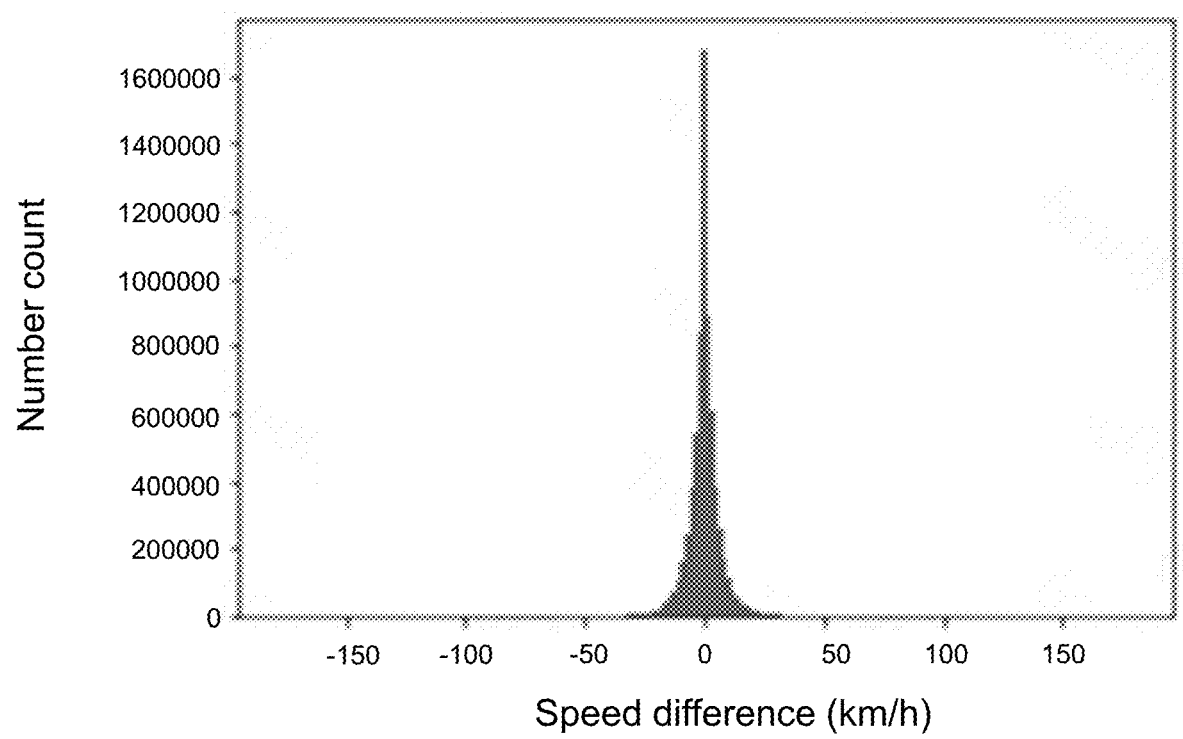
FIG. 8 is a diagram of an example of the number distribution of samples related to speed differences of different road sections according to some embodiments of the present disclosure.

FIG. 8 is a diagram of an example of the number distribution of samples related to speed differences of different road sections according to some embodiments of the present disclosure. As shown in FIG. 8, the horizontal axis represents speed differences, and the vertical axis represents the number counts of samples related to the speed differences. As shown in FIG. 8, the speed differences of different road sections as a whole, may fluctuate around 0. Features of the road sections may be omitted when the preliminary prediction model is trained because the speed differences may decrease the differences of road speeds of different road sections and the differences of different road sections. As a result, training the preliminary prediction model using the speed differences may increase the accuracy and the efficiency of the trained prediction model.

Figure 9:
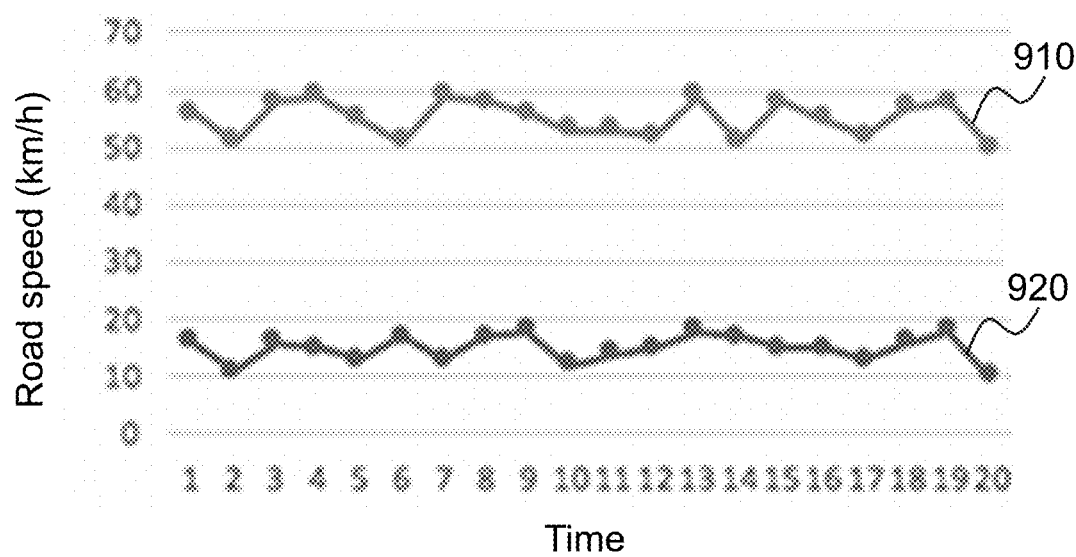
FIG. 9 is a diagram illustrating an example of the distribution of road speeds of two types of road sections according to some embodiments of the present disclosure.

Merely by way of example, FIG. 9 is a diagram illustrating an example of the distribution of road speeds of two types of road sections according to some embodiments of the present disclosure. As shown in FIG. 9, the horizontal axis represents time intervals, and the vertical axis represents road speeds. Curve 910 refers to the distribution of the road speeds of a first type of road sections corresponding to 20 time intervals. Curve 920 refers to the distribution of the road speeds of a second type of road sections corresponding to the same 20 time intervals. As shown in FIG. 9, the road speeds of the first type of road sections may be relatively higher (e.g., in the range of 50-60 km/h), and the road speeds of the second type of road sections may be relatively lower (e.g., in the range of 10-20 km/h). If the trained prediction model is generated by training a preliminary prediction model directly using the road speeds of the two types of road sections, various features related to the type of road sections (e.g., expressway sections, speed-limited road sections, etc.) may be required to effectively train the preliminary prediction model.

Figure 10:
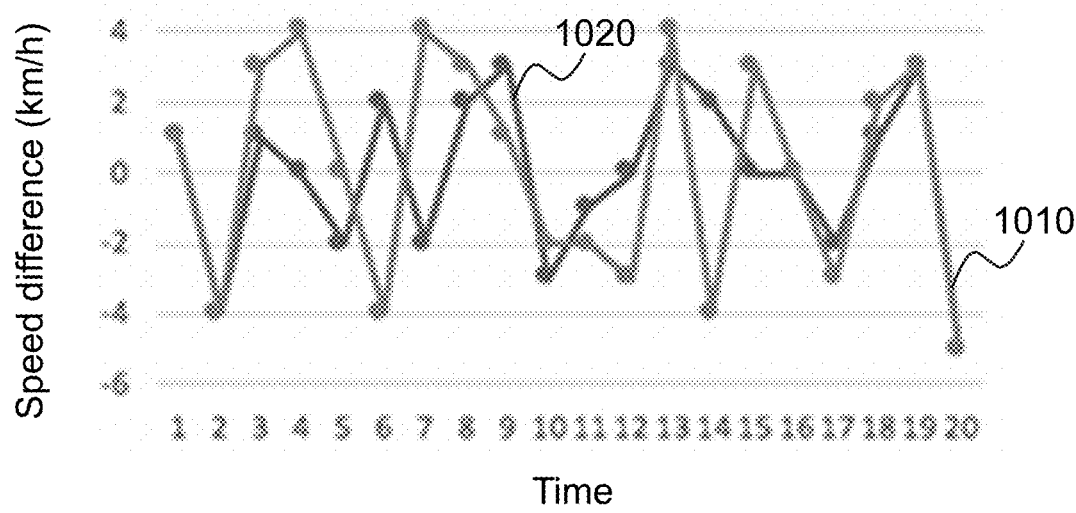
FIG. 10 is a diagram illustrating an example of the distribution of speed differences of two types of road sections according to some embodiments of the present disclosure.

FIG. 10 is a diagram illustrating an example of the distribution of speed differences of two types of road sections according to some embodiments of the present disclosure. For each road speed in FIG. 9, a speed difference between the road speed and another road speed of the same type of road sections (e.g., the road speed corresponding to time interval 20) may be determined. As shown in FIG. 10, the horizontal axis represents time intervals, and the vertical axis represents road speeds. Curve 1010 refers to the distribution of the speed differences of the first type of road sections corresponding to the 20 time intervals. Curve 1020 refers to the distribution of the speed differences of the second type of road sections corresponding to the 20 time intervals. As shown in FIG. 10, the speed differences of the two types of road sections are in a same range (e.g., −4-4 km/h). If the trained prediction model is generated by training a preliminary prediction model using the speed differences of the two types of road sections, the effect of the feature of the type of road seconds can be reduced and the features related to the type of road sections can be omitted, thus ensuring more effective training of the preliminary prediction model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 600 in the present disclosure may be performed by other devices, such as a third-party device communicating with the speed prediction system 100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for speed prediction, comprising:
   at least one storage medium including a set of instructions;
   at least one processor in communication with the at least one storage medium, wherein when executing the set of instructions, the at least one processor is directed to cause the system to:
      obtain current vehicle speeds associated with first vehicles that pass through a target road section in a current time interval;
      determine a current road speed associated with the target road section in the current time interval based on the current vehicle speeds;
      determine a predicted speed difference between the current road speed and a future road speed associated with the target road section in a future time interval based on the current road speed and a trained prediction model, which is based on prior speed differences, wherein the current time interval and the future time interval are separated by a first time period; and
      estimate the future road speed based on the predicted speed difference and the current road speed.

2. The system of claim 1, wherein the trained prediction model is provided by
   obtaining prior road speeds associated with a plurality of road sections in prior time intervals;
   determining a plurality of prior speed differences each of which is between two of the prior road speeds; and
   training a preliminary prediction model with the plurality of prior speed differences to generate the trained prediction model.

3. The system of claim 2, wherein the obtaining of the prior road speeds associated with the plurality of road sections in the prior time intervals includes:
   obtaining instantaneous speeds associated with second vehicles that pass through the plurality of road sections in the prior time intervals;
   preprocessing the instantaneous speeds;
   determining prior vehicle speeds associated with the second vehicles in the prior time intervals based on the preprocessed instantaneous speeds; and
   determining the prior road speeds based on the prior vehicle speeds.

4. The system of claim 2, wherein the training of the preliminary prediction model with the plurality of prior speed differences to generate the trained prediction model includes:
   dividing the plurality of prior speed differences into a plurality of groups; and
   training the preliminary prediction model based on the plurality of groups, respectively, to generate the trained prediction model.

5. The system of claim 4, wherein the trained prediction model is further provided by
   determining prior speed differences associated with a second time period that is immediately before a current time point; and
   updating, based on the prior speed differences associated with the second time period, parameters of the trained prediction model for determining the predicted speed difference associated with the first time period.

6. The system of claim 1, wherein when executing the set of instructions, the at least one processor is further directed to cause the system to:
   predict whether the target road section is congested in the future time interval.

7. The system of claim 1, wherein when executing the set of instructions, the at least one processor is directed to further cause the system to:
   transmit a speed alert to a user device associated with a user of a transportation service, wherein the user has an option to pass through the target road section in the future time interval.

8. The system of claim 7, wherein the speed alert further includes an inquiry to the user for choosing a route that leads to the target road section or another route that does not lead to the target road section.

9. A method for speed prediction implemented on a computing device having at least one storage device and at least one processor, the method comprising:
- obtaining current vehicle speeds associated with first vehicles that pass through a target road section in a current time interval;
- determining a current road speed associated with the target road section in the current time interval based on the current vehicle speeds;
- determining a predicted speed difference between the current road speed and a future road speed associated with the target road section in a future time interval based on the current road speed and a trained prediction model, which is based on prior speed differences, wherein the current time interval and the future time interval are separated by a first time period; and
- estimating the future road speed based on the predicted speed difference and the current road speed.

10. The method of claim 9, wherein the trained prediction model is provided by
- obtaining prior road speeds associated with a plurality of road sections in prior time intervals;
- determining a plurality of prior speed differences each of which is between two of the prior road speeds; and
- training a preliminary prediction model with the plurality of prior speed differences to generate the trained prediction model.

11. The method of claim 10, wherein the obtaining of the prior road speeds associated with the plurality of road sections in the prior time intervals includes:
- obtaining instantaneous speeds associated with second vehicles that pass through the plurality of road sections in the prior time intervals;
- preprocessing the instantaneous speeds;
- determining prior vehicle speeds associated with the second vehicles in the prior time intervals based on the preprocessed instantaneous speeds; and
- determining the prior road speeds based on the prior vehicle speeds.

12. The method of claim 10 or 11, wherein the training of the preliminary prediction model with the plurality of prior speed differences to generate the trained prediction model includes:
- dividing the plurality of prior speed differences into a plurality of groups; and
- training the preliminary prediction model based on the plurality of groups, respectively, to generate the trained prediction model.

13. The method of claim 12, wherein the trained prediction model is further provided by
- determining prior speed differences associated with a second time period that is immediately before a current time point; and
- updating, based on the prior speed differences associated with the second time period, parameters of the trained prediction model for determining the predicted speed difference associated with the first time period.

14. The method of claim 9, the method further comprising:
- predicting whether the target road section is congested in the future time interval.

15. The method of claim 9, the method further comprising:
- transmitting a speed alert to a user device associated with a user of a transportation service, wherein the user has an option to pass through the target road section in the future time interval.

16. The method of claim 15, wherein the speed alert further includes an inquiry to the user for choosing a route that leads to the target road section or another route that does not lead to the target road section.

17. A non-transitory computer readable medium, comprising at least one set of instructions for speed prediction, wherein when executed by one or more processors of a computing device, the at least one set of instructions causes the computing device to perform a method, the method comprising:
- obtaining current vehicle speeds associated with first vehicles that pass through a target road section in a current time interval;
- determining a current road speed associated with the target road section in the current time interval based on the current vehicle speeds;
- determining a predicted speed difference between the current road speed and a future road speed associated with the target road section in a future time interval based on the current road speed and a trained prediction model, which is based on prior speed differences, wherein the current time interval and the future time interval are separated by a first time period; and
- estimating the future road speed based on the predicted speed difference and the current road speed.

* * * * *